(12) United States Patent
Fleck

(10) Patent No.: US 6,268,702 B1
(45) Date of Patent: Jul. 31, 2001

(54) LAMP FOR AN EXTERNAL WARNING LIGHT

(75) Inventor: Leonard Fleck, Gosport (GB)

(73) Assignee: L.F.D. Limited, Hampshire (GB)

(*) Notice: Subject to any disclaimer, the term of this patent is extended or adjusted under 35 U.S.C. 154(b) by 0 days.

(21) Appl. No.: 09/611,824

(22) Filed: Jul. 7, 2000

Related U.S. Application Data

(63) Continuation of application No. 08/981,727, filed as application No. PCT/GB97/03091 on Nov. 11, 1997, now abandoned.
(60) Provisional application No. 60/032,409, filed on Dec. 4, 1996.

(30) Foreign Application Priority Data

Nov. 12, 1996 (GB) ................................... 9623500

(51) Int. Cl.⁷ .................................................. H05B 37/00
(52) U.S. Cl. .................... 315/185 R; 315/192; 315/193; 362/231; 362/545
(58) Field of Search ..................... 362/545, 230, 362/231; 340/815.45; 315/312, 185 R, 193, 192

(56) References Cited

U.S. PATENT DOCUMENTS

| | | |
|---|---|---|
| 4,211,955 | 7/1980 | Ray . |
| 4,580,196 | 4/1986 | Task . |
| 4,870,325 | 9/1989 | Kazar . |
| 4,912,334 | 3/1990 | Anderson . |
| 4,963,798 | 10/1990 | McDermott . |
| 5,463,280 | 10/1995 | Johnson . |
| 6,011,493 | 1/2000 | Bushell et al. . |

FOREIGN PATENT DOCUMENTS

| | | |
|---|---|---|
| 3622025 C1 | 10/1987 | (DE) . |
| 3832109 A1 | 3/1990 | (DE) . |
| 3932213 A1 | 4/1991 | (DE) . |
| 2426381 | 5/1978 | (FR) . |
| 2586844 A1 | 3/1987 | (FR) . |
| 2307977 A | 9/1996 | (GB) . |
| 1264276 | 10/1989 | (JP) . |

Primary Examiner—David Vu
(74) Attorney, Agent, or Firm—Ware, Fressola, Van Der Sluys & Adolphson LLP

(57) ABSTRACT

A LED lamp has a tubular metal body 1 having bayonet fitting lugs 2 and a central insulated contact 3 at its base. The top 4 of the body is angled and has a small metal plate 5 set in potting compound 6 arranged flush with the angled top 4. The plate 5 has two arrays 7,8 of LEDs mounted on it. The LEDs are protected by a layer of transparent encapsulant 9. The LEDs 7 are visible light LEDs, and up to two hundred of them are arranged in a series/parallel array 70. The LEDs 8 are infra-red LEDs, with four arranged in a series parallel array 80. The cathodes 71 of the LEDs 7 on the cathode side of the array 70 and the anodes 82 of the LEDs 8 on the anode side of the array 80 are commonly connected via leads 11 to the body 1. The anodes 72 on the anode side of the array 70 are connected via a current limiting resistor 12 to the central contact 3. Similarly the cathodes 81 on the cathode side of the array 80 are connected via a reverse voltage limiting diode 13 and a current limiting resistor 14 to the central contact 3. When the central contact has a positive voltage applied to it of say 28 volts, the VL LEDs 7 are excited, and emit light; whilst the IR LEDs 8 are not excited. When the polarity is reversed, the IR LEDs are excited and emit IR light and the VL LEDs are not excited.

17 Claims, 4 Drawing Sheets

LAMP FOR AN EXTERNAL WARNING LIGHT

This application is a continuation of U.S. application Ser. No. 08/981,727, filed on Jan. 26, 1999, now abandoned, which is a 35 U.S.C. 371 of PCT/GB97/03091 filed on Nov. 11, 1997, and claims benefit of provisional application Ser. No. 60/032,409, filed on Dec. 4, 1996.

TECHNICAL FIELD

The present invention relates to a lamp for an external warning light, particularly for use in an aircraft navigation light.

BACKGROUND OF THE INVENTION

It is known to fit infra-red light emitting diode (IR LED) lamps adapted with bayonet fittings in place of filament bulbs in the navigation lights of an aircraft to suit it for convert night flying. The IR LED lamps enable the aircraft to be seen by the pilot of a companion aircraft using night vision goggles.

Night vision goggles intensify images, whereby a small number of IR LED chips can be used. An equivalent number of visible light, light emitting diodes (VL LEDs) would be scarcely visible to the human eye at more than a few tens of meters.

SUMMARY OF THE INVENTION

The object of the present invention is to provide a VL LED filament lamp replacement.

According to the invention, there is provided a lamp for an external warning light comprising a body providing a drive terminal and a return terminal, a series/parallel array of a plurality of visible light, light emitting diodes (VL LEDs) arranged on a carrier mounted on the body and a current limiting device mounted within the body for limiting current drawn by the VL LEDs, the current limiting device being connected in series with the array of VL LEDs, with the array and the limiting current being connected between the drive terminal and the return terminal.

Preferably, the body is a bayonet fitting body adapted to co-operate with a bayonet fitting socket, with the drive terminal being a central terminal and the return terminal being bayonet fitting lugs.

Whilst the current limiting device mounted within the body can be simply a resistor; the preferred device is an integrated circuit device in series with the VL LEDs, which is adapted to limit forward current through them when their resistance falls on heating in use. Additionally, a forward voltage regulation resistor can be connected in series with the VL LED array and the integrated circuit, forward current limiting device.

Normally, the carrier will comprise a ceramic substrate on which the VL LED array is mounted and covered in transparent material, with the ceramic substrate being mounted on a metal heat sink. The material can be a rigid potting material or a flexible encapsulant.

In accordance with an important preferred feature of the invention, the lamp can include at least one infra-red light emitting diode (IR LED) arranged on the carrier in like manner to the VL LEDs, the IR LED(s) and the VL LED array being respectively oppositely connected between the drive terminal and the return terminal; whereby application of voltage of one polarity will illuminate either the IR LED(s) or the VL LEDs and voltage of the opposite polarity will illuminate the other(s) of the VL LEDs and the IR LED(s).

Whilst a plurality of the IR LEDs can be arranged in another series/parallel array or a parallel array; there will normally be an order of magnitude more VL LEDs than IR LEDs.

In one embodiment, there is provided an optical screen, the IR LED(s) being placed adjacent the optical screen, whereby the lamp can be arranged in use for the infra red light to be emitted upwards only with the screen intercepting downward infra red light.

Preferably, an electrical protection device, typically a forward voltage regulation resistor and/or a reverse voltage limiting diode, will be connected in series with the IR LED(s).

Normally, the values of the LEDs and the electrical protection devices will be such that the lamp is adapted to be powered at one voltage (with one polarity) for illumination of the VL LEDs and another voltage (with the opposite polarity) for illumination of the IR LED(s).

In accordance with another aspect of the invention there is provided an aircraft lighting circuit for operating one or more lamps of the invention, the circuit including an opposite voltage generation circuit and a switch arranged to switch the polarity of voltage applicable to lamps fitted in the circuit for illuminating the VL LEDs with one polarity and the IR LED(s) with the other polarity.

Preferably, the aircraft lighting circuit includes a differential amplifier circuit to which the switch is connected for switching on alternative inputs of the amplifier and a power output circuit for powering the VL LEDs or the IR LED(s).

BRIEF DESCRIPTION OF THE DRAWINGS

To help understanding of the invention, a specific embodiment thereof will now be described by way of example and with reference to the accompanying drawings, in which.

BEST MODE FOR CARRYING OUT THE INVENTION

Figure 1:
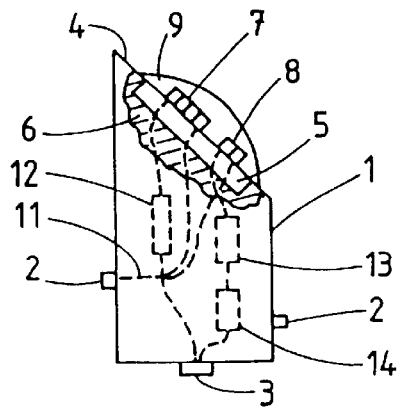
FIG. 1 is a partially sectioned side view of an LED lamp of the invention.
Figure 2:
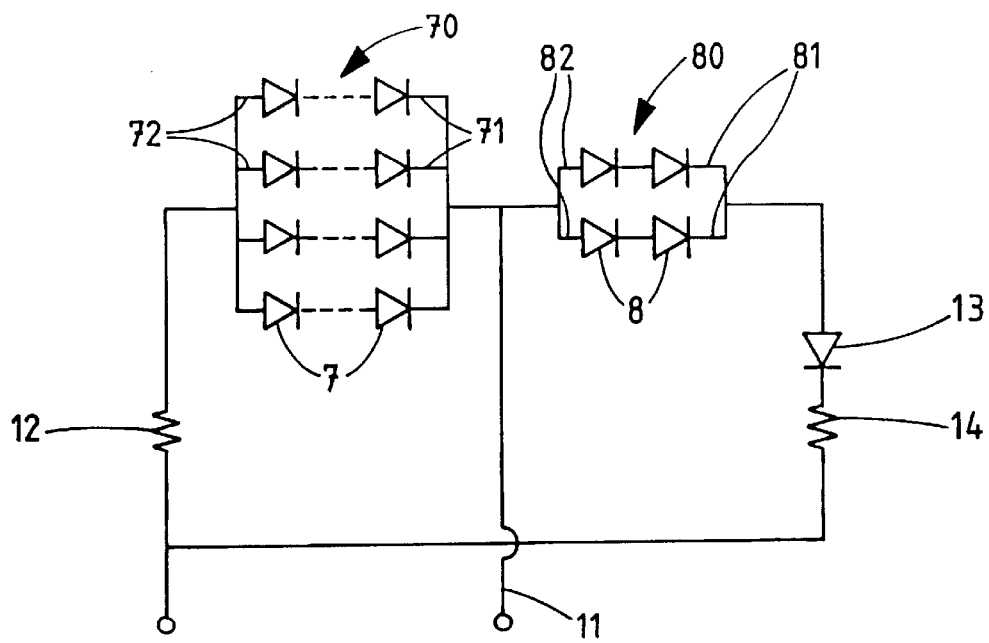
FIG. 2 is a circuit diagram of the LED lamp.

Referring to FIGS. 1 and 2, the LED lamp there shown has a tubular metal body 1 having bayonet fitting lugs 2 and a central insulated contact 3 at its base. These components are arranged in the manner of the bayonet fitting of a filament lamp. The top 4 of the body is angled and has a small metal plate 5 set in potting compound 6 arranged flush with the angled top 4. The plate 5 has two arrays 7, 8 of LEDs mounted on it. They are protected by a layer of transparent plastics material 9.

The LEDs 7 are visible light LEDs, and up to eighty of them are arranged in a series/parallel array 70. The LEDs 8 are infra-red LEDs, with four arranged in a series parallel array 80. The cathodes 71 of the LEDs 7 on the cathode side of the array 70 and the anodes 82 of the LEDs 8 on the anode side of the array 80 are commonly connected via leads 11 to the body 1.

The anodes 72 on the anode side of the array 70 are connected via a current limiting resistor 12 to the central contact 3. Similarly the cathodes 81 on the cathode side of the array 80 are connected via a reverse voltage limiting diode 13 and a current limiting resistor 14 to the central contact 3.

When the central contact has a positive voltage applied to it of say 28 volts, the VL LEDs 7 are excited, and emit light; whilst the IR LEDs 8 are not excited. The current limiting resistor 12 limits the forward current passing through the individual VL LEDs 7, even when they have been operating for some time and their resistance has dropped due to their temperature rise. Mounting them on the metal plate 5 helps to restrict the temperature rise as it acts as a heat sink. During illumination of the VL LEDs, the reverse voltage limiting diode connected in series with the IR LEDS limits the reverse voltage across them.

According to the wavelength of the LEDs and the number of them, particularly the number in parallel with each other, the brightness can be that of the equivalent filament bulb. The LEDs can be all red or all green according to whether they are for port or starboard lights. If the lamp is for a white tail light, a mixture of red, green and blue LEDs can be used.

When the polarity is reversed, the IR LEDs are excited and emit IR light and the VL LEDs are not excited. The forward current through the former is controlled by the resistor 14 and the reverse voltage across the latter is restricted by the number of them in series.

Thus by use of the LED replacement lamps, an aircraft's navigation lights can be switched from normal to covert simply by reversing the polarity of the voltage supplied to them.

Where visible navigation lights only are required, as in civil aircraft, the IR LEDs can be omitted from the lamp.

It should be noted that although the embodiment of FIG. 1 has its top 4 and the diode plate 5 angled, the angle can be smaller or greater than shown and in particular it is envisaged that they may be set at 90° to the axis of the tube.

It is envisaged that the two current limiting resistors 12, 14 could be replaced by a single one in the line 11, but because the value of resistance required for the VL and IR LEDs respectively varies, the individual resistor 12, 14 are preferred.

Turning now to FIGS. 3 to 6, there is shown a second lamp according to the invention. It also has a tubular metal body 101 with bayonet fitting lugs 102 and a central insulated contact 103 at its base. The end 104 of the body is at right angles to its length and carries a small metal plate 105. To this is adhered a ceramic substrate 106 for two arrays 170, 180 of LEDs 107, 108 mounted on it. They are protected by a layer of transparent potting material 109. The substrate is of beryllium oxide, whilst the plate is of steel, in order to provide compatibility of thermal expansion. A pair of contact leads 110, 111 extend back from the substrate, through the plate 105 and a further backing plate 112, via apertures with insulating bushes 113. The plates 105, 112 are clipped to the body end 104 by a crimped band 1145, which ensures good electrical contact between the plate 105 and the body 104.

Figure 4:
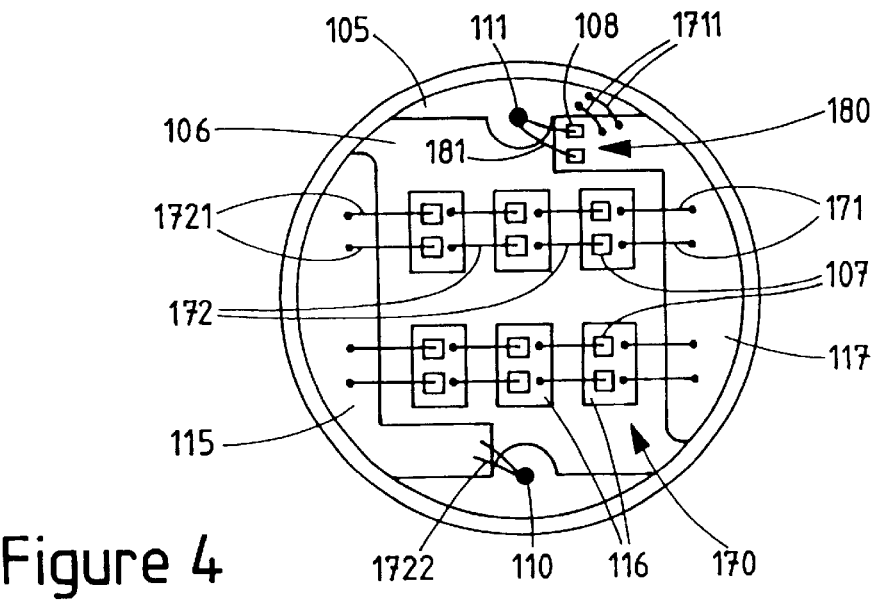
FIG. 4 is a simplified plan view of the LED arrays on a ceramic substrate of the second lamp.

The LEDs 107 are visible light LEDs (VL LEDs) and the LEDs 108 are infra-red LEDs (IR LEDs). They are available from Opto Diode Corporation of Newbury Park, Calif. Typically one hundred and eighty of the VL LEDs 107 are arranged in a series/parallel array 170; whereas four IR LEDs 108 are arranged in a parallel array 180. FIG. 4 is a diagrammatic in showing a few only of the VL LEDs. The substrate 106 has conductive gold deposits 115, 116, 117 on it. The deposits 115, 117 are terminal deposits, whilst the deposits 116 form an array. The VL LEDs 107 are adhered with conductive adhesive to the deposits 116 with their anodes 172 leading to the next deposit. The last anodes 1721 lead to the terminal deposit 115, whence anode leads 1722 are connected to the VL contact lead 110. At the other, cathode end of the array 170, cathode leads 171 lead to the other terminal deposit 117. Thence further cathode leads 1711 lead to the plate 105, which forms the common terminal for both the VL and IR LEDs. The latter, typically four of them, are mounted on their anode side on the terminal deposit 117, with their cathode leads 181 being connected to the IR contact lead 111.

On a circuit board 120 for electrical protection devices, there is arranged a 12R forward voltage regulation resistor 121 in series with the IR LEDs. A 4.7R (for red and yellow LEDs) or 6.8R (for green LEDs) forward voltage regulation resistor 122 is connected in series with the VL LEDs, as is an integrated circuit, forward current limiting device 123. Suitably this is a LM 117HV from National Semiconductor. Not only does it limit the forward current through the LED array, it progressively restricts this current if the lamp overheats for any reason above 150° C. For its protection, it is provided with reverse voltage protection diodes 124 and an anti-oscillation capacitor 125.

Due to the number of VL LEDs in series, typically nine, and the normal DC supply voltage of an aircraft being 28 volts, it is convenient to drive the lamp for visible light with a voltage close to 28 volts. On the other hand, the number of IR LEDs need be only small, without the need for a series array. Thus it is convenient to drive these with a much lower negative voltage.

An aircraft lighting drive circuit 150 for the lamps is provided with a switch 151, switchable between a visible light position, in which it produces +24 volts on its output line 152 and an infra red position in which it produces −4.0 volts on line 152.

The drive circuit 150 is driven form the aircraft's +28 volts supply. For driving the IR LEDs with −4.0 volts, the circuit includes an inverter/rectifier circuit 153 for generating −5.0 volts. The circuit 153 is conventional and will not be described in more detail.

Figure 6:
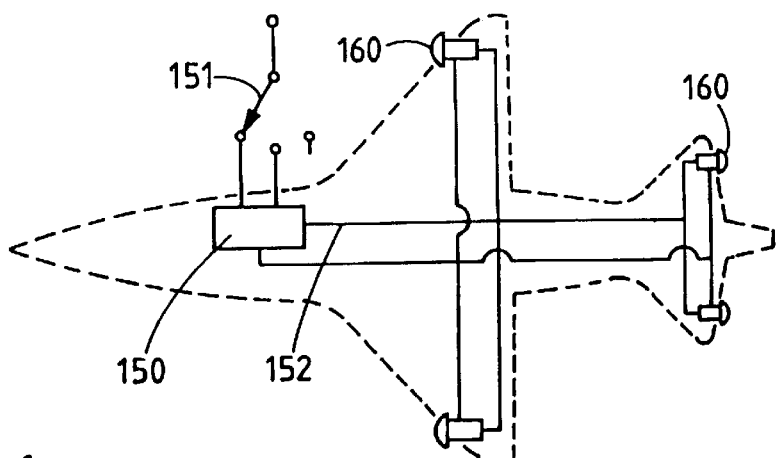
FIG. 6 is a circuit diagram of an aircraft lighting circuit for an aircraft equipped with lamps according to the invention.
Figure 7:
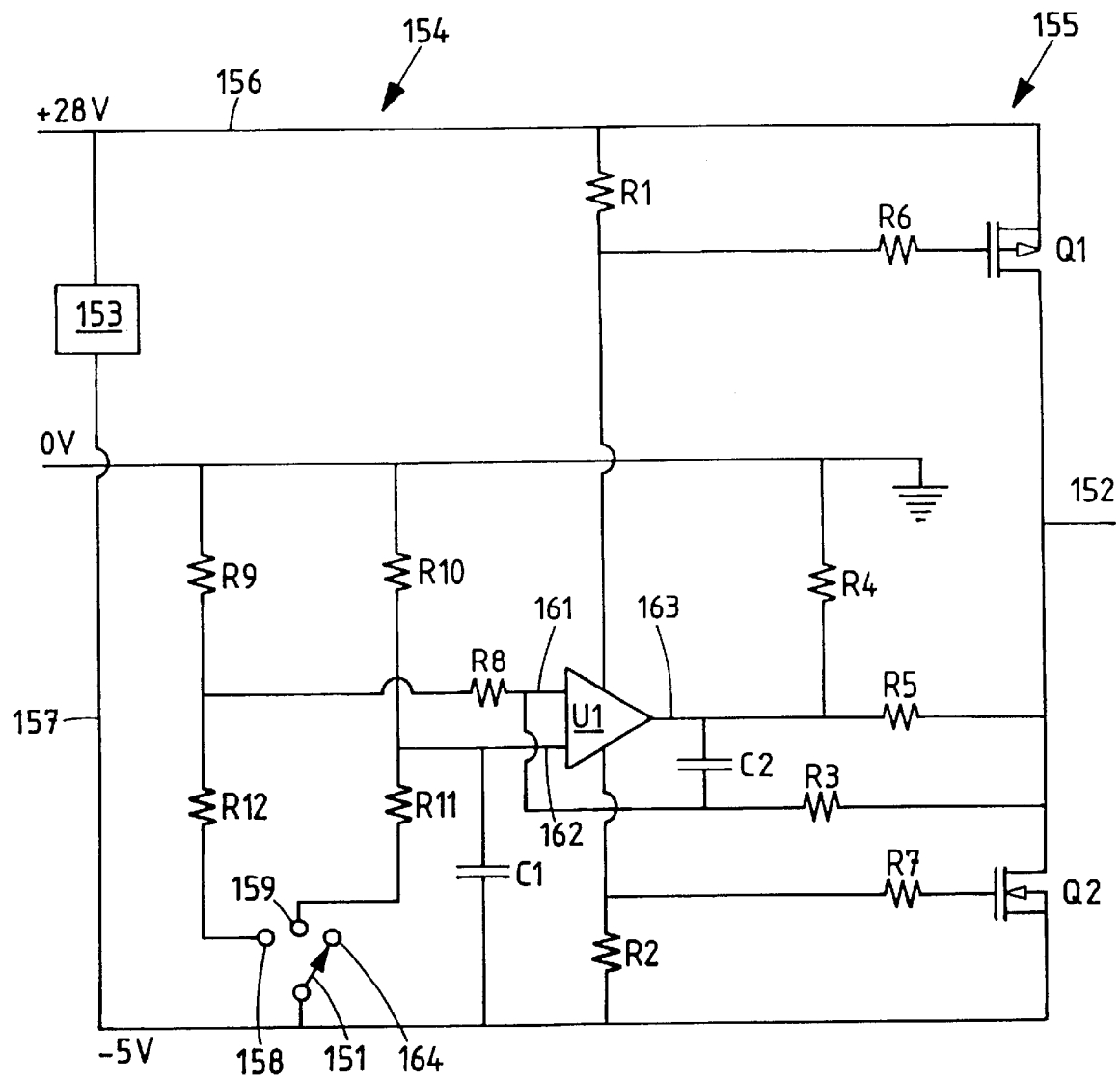
FIG. 7 is a circuit diagram of a driver for the aircraft lighting circuit.

The drive circuit 150, as shown in FIG. 7, also includes differential amplifier and power circuits 154, 155. These are powered jointly by +28 volts and −5 volts lines 156,157. The switch 151 switches −5 volts to either of two visible light (VL) and infra red (IR) inputs 158, 159. A TLE2021 operational amplifier U1 drives a 680R load resistor R4. The positive or negative current driven into resistor R4 must pass through the power supply pins of the operational amplifier U1, where it generates a voltage across respective 3k3 load resistors R1,R2. This voltage is fed to the gates of MOSFETs Q1,Q2, where it tends to turn them on and drive the output voltage on line 152 in the same direction as the drive applied to resistor R4. The 3 k resistor R5 provides negative feedback reducing the gain of the power circuit. 100R resistors R6,R7 reduce the high frequency gain of the amplifier to reduce spurious oscillations. The output current capability of the circuit is limited by the resistance and power dissipation ability only of the MOSFETs, whereby the circuit can drive an aircraft's six lamps 160, such as shown in FIG. 6.

The operational amplifier U1 is configured as a differential input operational amplifier circuit. The VL input 158 from the switch is connected a potential divider comprised of 3K9 resistor R12 and grounded 5k6 resistor R9. The junction of these resistors is connected via a further 20 k resistor R8 to the inverting input 161 of the operational amplifier U1. Similarly the IR input 159 is connected to the non-inverting input 162 via a potential divider comprised of 18 k resistor R11 and grounded 2 k resistor R10. 180 k feedback resistor R3 is connected from the output line 152 to the inverting input 161. The nominal gain of the amplifier is the ratio the value of R3 divided by R8, i.e. 9. High frequency gain limiting capacitors C1, C2 connect the non-inverting input 162 to the −5.0 volts line 157 and the operational amplifier output 163 to the inverting input 161, respectively.

With the switch set to its off position 164, the inputs 161,162 are both at 0 volts and the output 163 and the line 152 is at 0 volts.

With the switch set to the IR input 159, the inverting input 161 is at 0 volts, whilst the non-inverting input 162 is held by the potential divider R10,R11 to −5.0×2000/(2000+18000), i.e. −0.5 volts. The effective resistance of the input resistor R8 and the source resistance of the potential divider R12,R9 is 22.3 k. Thus the effective non-inverting gain of the amplifier is R3/22.3, i.e. 8.07. The output voltage is thus 8.07×−0.5, i.e. nominally −4 volts.

With the switch set to the VL input 158, the non-inverting input 162 is at 0 volts. In this condition, the inverting input is a virtual earth. This places resistor R8 in effect in parallel with resistor R9, giving this leg of the potential divider R12,R9 a resistance of 4.38 k. Thus the inverting input 161 is held by the potential divider R12,R9 to −5.0×4.38/(3.9+4.38), i.e. −2.64 volts. The inverting gain of the amplifier is −R3/R8, which is −9, and the resulting output voltage is −2.64×9, i.e. nominally +23.8 volts.

Thus according to the position of the switch the IR LEDs are driven at −4 volts, or the VL LEDs are driven at approximately +24 volts.

Figure 3:
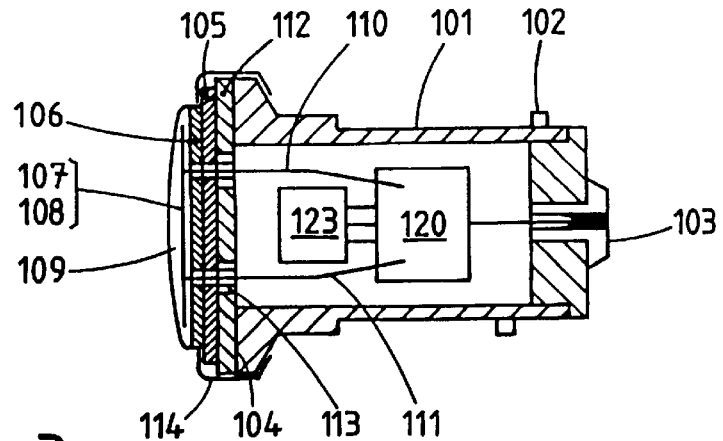
FIG. 3 is a cross-sectional side view of a second lamp of the invention.
Figure 5:
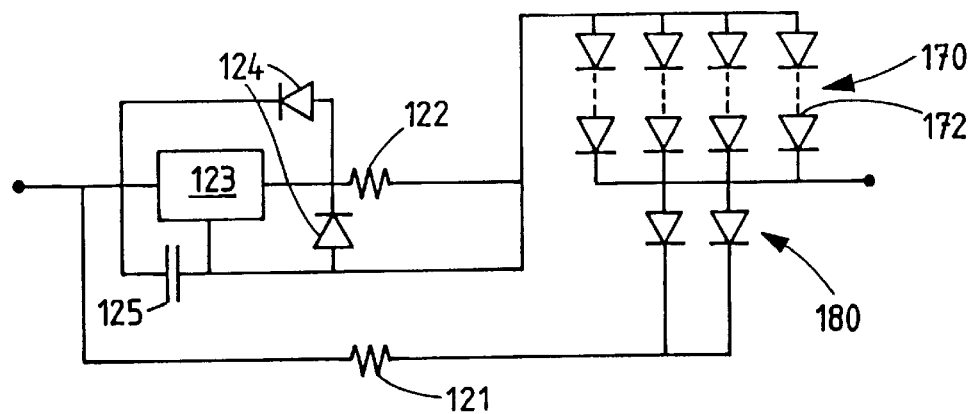
FIG. 5 is a circuit diagram of the second lamp.
Figure 8:
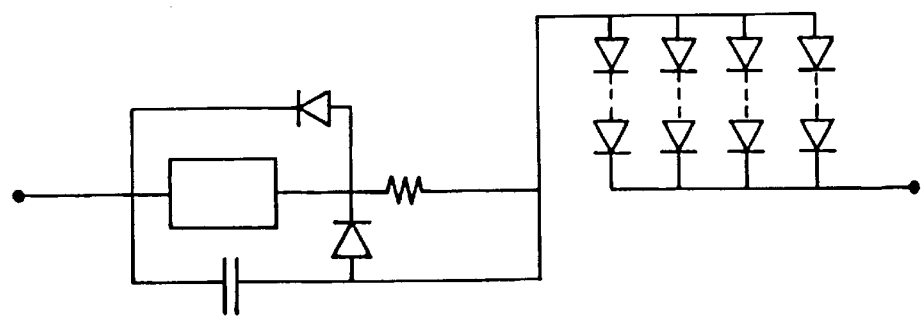
FIG. 8 is a circuit diagram of a third lamp of the invention.

Turning now to FIG. 8, there is shown a circuit diagram for a lamp which is identical with the lamp of FIGS. 3, 4 & 5, except that the IR LEDs are omitted. The components of this lamp can be chosen so that it can be driven directly from the aircraft's 28 volts supply as a visible light, filament bulb lamp replacement.

Figure 9:
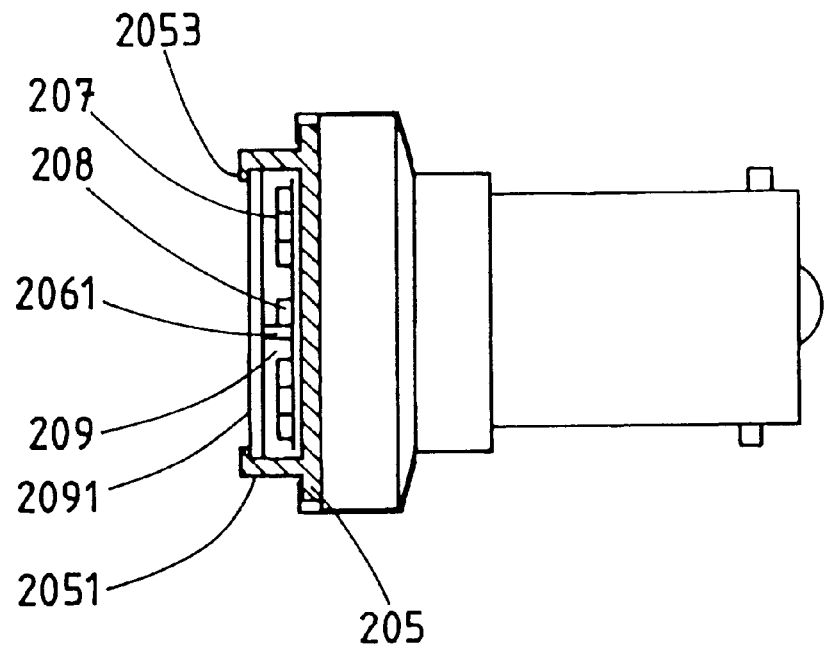
FIG. 9 is a view similar to FIG. 3 of a fourth lamp of the invention and FIG. 10 is a view similar to FIG. 4 of the fourth lamp.
Figure 10:
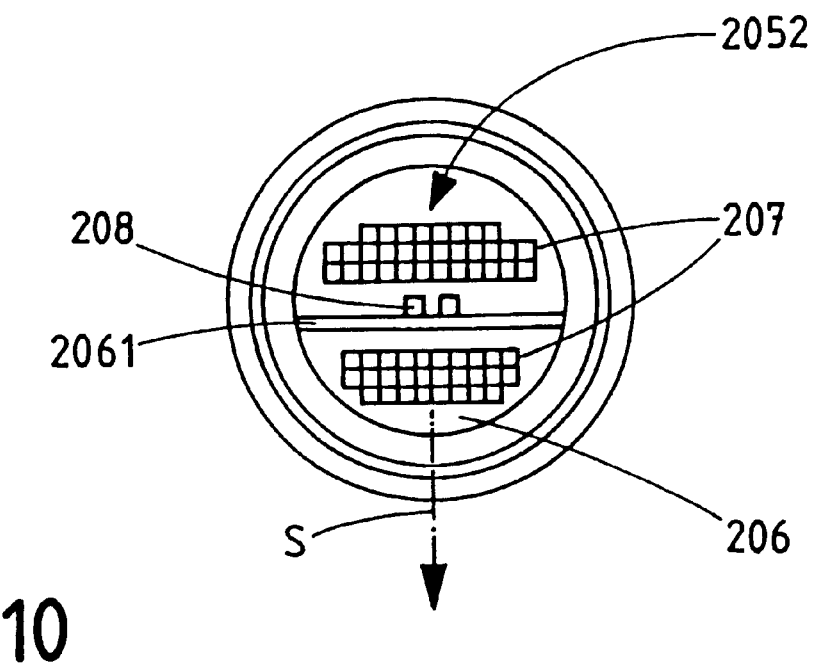

Finally FIGS. 9 & 10 show an alternative structure for encapsulating the VL LEDs 207, the IR LEDs 208 and their substrate 206. The steel plate 205, on which they are mounted, is provided with an circumferential up-stand 2051. The region 2052 over the substrate is filled with a flexible, transparent, silicone encapsulant 209, covered by a glass plate 2091. This is retained by a turned over lip 2053 of the upstand. This arrangement avoids problems which can arise due to differential expansion of the potting compound 109 and the other components, which it covers. This lamp includes a further upstand 2061 from the substrate 206, with the IR LEDs 208 arranged adjacent this further upstand. This arrangement screens the infra red light from being emitted in the direction of the arrows S in FIG. 9. This is useful preventing the infra red light being directed downwards from an aircraft using covert lighting.

The lamps of the invention provide advantage in providing a robust filament bulb lamp replacement for visible navigation lights. Also for covert lighting applications, they provide a means of providing a single lamp which can produce selectively infra red or visible light. This has the attendant advantage of avoiding the need for hard wiring two lighting circuits into an aircraft. This is a major expense.

What is claimed is:

1. A lamp for an external warning light comprising:
    a body providing a drive terminal and a return terminal,
    a carrier mounted on the body,
    a series/parallel array of a plurality of visible light, light emitting diodes (VL LEDs) arranged on the carrier mounted on the body,
    a current limiting device mounted within the body for limiting current drawn by the VL LEDs, the current limiting device being connected in series with the array of VL LEDs, with the array and the limiting current being connected between the drive terminal and the return terminal and
    at least one infra-red light emitting diode (IR LED) arranged on the carrier in like manner to the VL LEDs, each IR LED and the VL LED array being respectively oppositely connected between the drive terminal and the return terminal, whereby application of voltage of one polarity will illuminate either each IR LED or the VL LEDs and voltage of the opposite polarity will illuminate the other(s) of the VL LEDs of each IR LED.

2. A lamp according to claim 1, including a plurality of the IR LEDs arranged in another series/parallel array or a parallel array.

3. A lamp according to claim 2, wherein there is an order of magnitude more VL LEDs than IR LEDs.

4. A lamp according to claim 1, including an optical screen, each IR LED being placed adjacent the optical screen, whereby the lamp can be arranged in use for the infra-red light to be emitted upwards only with the screen intercepting downward infra-red light.

5. A lamp according to claim 1, including a forward voltage regulation resistor connected in series with each IR LED as an electrical protection device.

6. A lamp according to claim 1, including a reverse voltage limiting diode, connected in series with each IR LED as an electrical protection device.

7. A lamp according to claim 5, wherein the values of the LEDs and the forward voltage regulation resistor are such that the lamp is adapted to be powered at one voltage (with one polarity) for illumination of the VL LEDs and another voltage (with the opposite polarity) for illumination of each IR LED.

8. A lamp according to claim 6, wherein the values of the LEDs and the reverse voltage limiting diode are such that the lamp is adapted to be powered at one voltage (with one polarity) for illuminating of the VL LEDs and another voltage (with the opposite polarity) for illumination of each IR LED.

9. A lamp according to claim 1, wherein the body is a bayonet fitting body adapted to co-operate with a bayonet fitting socket, with the drive terminal being a central terminal and the return terminal being bayonet fitting lugs.

10. A lamp according to claim 1, wherein the current limiting device is a resistor.

11. A lamp according to claim 1, wherein the current limiting device is an integrated circuit device in series with the VL LEDs, adapted to limit forward current through them when their resistance falls on heating in use.

12. A lamp according to claim 11, including a forward voltage regulation resistor connected in series with the VL LED array and the integrated circuit, forward current limiting device.

13. A lamp according to claim 1, wherein the carrier comprises a ceramic substrate on which the VL LED array and each IR LED are mounted, and transparent materials covers both the VL LEDs and each IR LED.

14. A lamp according to claim 13, wherein the ceramic substrate is mounted on a metal heat sink.

15. An aircraft lighting circuit for operating one or more lamps according to claim 1, the circuit including an opposite voltage generation circuit and a switch arranged to switch the polarity of voltage applicable to lamp(s), fitted in the circuit for illuminating the VL LEDs with one polarity and each IR LED with the other polarity.

16. An aircraft lighting circuit according to claim 15, including a differential amplifier circuit to which the switch is connected for switching on alternative inputs of the amplifier and a power output circuit for powering the VL LEDs or each IR LED at respective voltages in accordance with the position of the switch.

17. An aircraft light circuit according to claim 15, wherein the opposite voltage generation circuit is adapted to generate a voltage of one polarity which is an order of magnitude higher than that of the other polarity.

* * * * *